July 3, 1973  K. K. K. KROYER ET AL  3,743,539
PROCESS AND APPARATUS FOR PRODUCING A FREE-FLOWING
GRANULAR GLUCOSE PRODUCT
Original Filed June 9, 1969
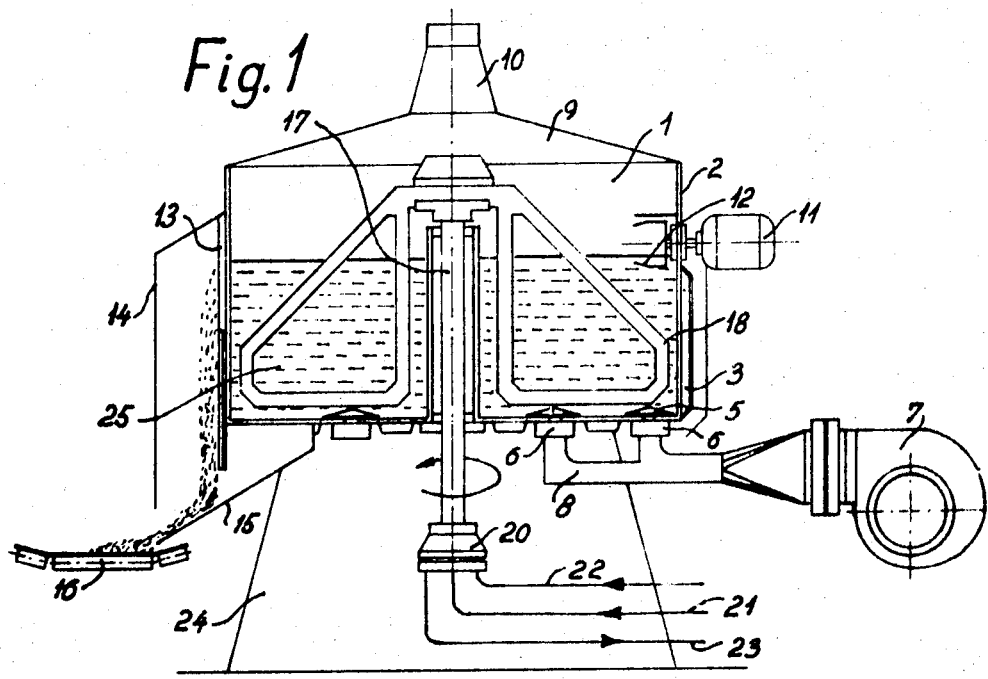
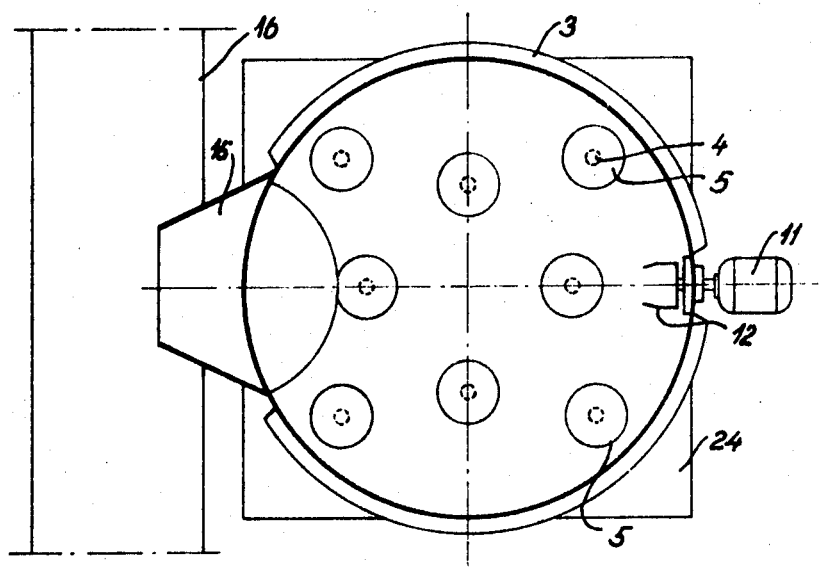
INVENTORS
Karl Kristian Kobs Kroyer
Lars Olav Thomsen
BY
Watson, Cole, Grindle & Watson
ATTORNEY United States Patent Office 3,743,539
Patented July 3, 1973

3,743,539
PROCESS AND APPARATUS FOR PRODUCING A FREE-FLOWING GRANULAR GLUCOSE PRODUCT
Karl Kristian Kobs Kroyer, Vestre Kongevej 80, Aarhus-Viby, Denmark, and Lars Olav Thomsen, Hojdedraget 3, Skanderborg, Denmark
Continuation of abandoned application Ser. No. 831,405, June 9, 1969. This application July 27, 1971, Ser. No. 166,602
Claims priority, application Great Britain, June 10, 1968, 24,289/68; May 13, 1969, 27,489/69
Int. Cl. C13f 1/02; C13k 1/10
U.S. Cl. 127—16
18 Claims

ABSTRACT OF THE DISCLOSURE

Process and apparatus for producing a free-flowing granular glucose product by supplying glucose solution to a glucose mass of temperature of 50–100° C., mechanically stirring the mixture of glucose solution and glucose mass, and removing the glucose product formed from the upper zones of the glucose mass.

---

This application is a streamlined continuation application of Ser. No. 831,405, filed June 9, 1969, now abandoned.

BACKGROUND OF THE INVENTION

This invention relates to a new and improved process for producing a free-flowing granular glucose product from a glucose solution having a DE-value of at least 88 and a dry matter content of at least 80 which solution has been prepared by starch hydrolysis. Such hydrolysates are normally referred to as liquid dextrose to distinguish them from other starch hydrolysates such as corn syrups and the liike.

The term "glucose solution" is to be understood as covering both homogeneous solutions and partly crystallized solutions.

In a prior art process for producing a free-flowing glucose product a pre-crystallized glucose solution is supplied to a mixing apparatus simultaneously with the introduction of recycled dry granular glucose product whereafter the mass thus formed is disintegrated and dried in a pneumatic drying apparatus.

In order to make such a recirculation effective large amounts of material have to be transported thus increasing both the initial costs and the operational costs of the apparatus for carrying out said process.

Furthermore, a mixture of a glucose solution and a glucose powder is difficult to transport without operational interruptions because coatings are readily formed on the internal surface of the transportation system used, unless the tackiness of the product is eliminated by conditioning the mixture before it is recycled.

The object of the present invention is to produce a free-flowing granular glucose product from a glucose solution without recycling the product formed.

SUMMARY OF THE INVENTION

This object is obtained by the process according to the invention which comprises the steps of continuously supplying said glucose solution to a solid granular glucose mass of a temperature of 50–100° C., said glucose solution being supplied at an hourly rate of less than twice the amount of the glucose mass present, mechanically stirring said mixture of glucose solution and glucose mass and continuously removing the free-flowing granular glucose product formed.

The reason why it is possible to obtain a free-flowing granular glucose product in one step by the process of the invention is not known with certainty. However, it appears that when mechanically stirring the mixture of glucose solution and glucose mass, the glucose solution is distributed over the surfaces of the glucose particles either as thin films or as droplets. The solid glucose particles contacting said film or droplets act as seeds which initiate a crystallization in the solution. The mixture of glucose solution and glucose mass which initially is tacky tends to cement the glucose particles together and during the progressing crystallization crystal bridges are formed between adjacent particles so as to form compact and hard but also brittle agglomerates. When said agglomerates are exposed to the stirring action said brittle crystal bridges will be broken down to form a glucose product consisting of particles of different sizes. However, it is well known that when such a mixture is stirred a fractionation takes place due to the fact that the finer particles descend and the greater particles rise relative to the total mixture. During said upward movement of the larger particles or agglomerates they are continuously subjected to the influence of the stirring action and under this treatment and presumably to a still higher degree under the influence of the surrounding particles the surfaces of said agglomerates are abraded. The small crystals or fragments thus formed will also move downwardly.

These fine particles are crystallized to such an extent that they are free-flowing and have a large surface area on which the glucose solution can be distributed. Consequently, the fines moving downward through the glucose mass increase the seeding efficiency.

If no such small particles are present and if fresh glucose solution is added to a still tacky mixture the tackiness will merely be increased and the tendency to form large agglomerates is also increased.

The stirring of the mixture should be sufficiently vigorous to cause the agglomerates formed to break down but should not unduly interfere with the above mentioned movement of particles in vertical direction.

If the amount of fines produced by the action of the stirring is too small a further mechanical treatment of the agglomerates to disintegrate them should be effected e.g. by means of a disintegrator.

It appears from the above explanation that a particularly advantageous effect is obtained if the glucose solution is introduced into and distributed in the glucose mass below the surface thereof and in such a manner that the fines moving downwardly in the glucose mass pass through the area in which the glucose solution is introduced and distributed.

A desirable movement of particles in vertical direction can be obtained by controlling the mechanical treatment or the addition of glucose solution or both. If too much solution is added a pasty mass is formed which completely destroys the desired production and streams of fines and which subsequently may stop the mixer. An amount of fine material equal to or greater than necessary to absorb the glucose solution added should pass through the area in which said solution is introduced.

In another preferred embodiment of the process of the invention the glucose solution is introduced in the glucose mass through discharge openings which are moved in relation to said mass. In this manner a more uniform distribution of the glucose solution within the glucose mass is obtained and the glucose solution does not accumulate at the discharge openings.

The rate of supplying glucose solution to the glucose mass may be varied within the above mentioned range depending on the DE-value and the dry matter content of the glucose solution used. However, the solution supplied per hour is preferably between 50 and 100% of the glucose mass. This corresponds to an average residence time of about 1–2 hours.

As mentioned above the glucose solution used has a DE-value of at least 88 and said value is preferably above 94. In general the DE-value should be as high as possible. If solutions having DE-values lower than 88 are used the crystallization proceeds too slowly and is insufficient to make the process practically feasible.

Without special means for evaporating water in the process the Brix value of the solution should not be less than 80 because the water left when the glucose has been crystallized tends to make the product formed tacky and tends to form a pasty mixture. Even with special means for evaporating water from the glucose mass it is considered uneconomical to use Brix values below 80.

In order to further reduce the water content of the glucose product and consequently to increase the storage stability, streams of air of controlled temperature may be passed through the glucose mass. There is no upper concentration limit as far as the water content is concerned and even a glucose solution consisting of anhydrous melt may be used. However, when the concentration is increased the difficulties in avoiding an unintentional crystallization in the feeding system also increase. To avoid this it can be necessary to heat the glucose solution but at temperatures above 110° C. an undesired colour development may take place. When the temperature is increased the viscosity of the syrup decreases and the distribution of the syrup in the granular glucose product is facilitated. A temperature range of between 90 and 110° C. constitutes a satisfactory compromise because the viscosity of the syrup is relatively low and the amount of heat supplied and consequently the colour development is acceptable.

The temperature of the glucose mass is preferably maintained within the range of from 50 to 90° C. and even more preferably at about 70–80° C. In this temperature range and with the use of hot air a glucose product of high storage stability is obtained.

The invention also relates to an apparatus for carrying out the above mentioned process. This apparatus comprises a container provided with a paddle mixer, inlet means for glucose solution and means for discharging the granular free-flowing glucose product formed.

A preferred embodiment of the apparatus of the invention comprises a vertical cylindrical vessel having an essentially flat bottom provided with air inlets. These air inlets which are connected with sources for supplying air of controlled temperature are preferably provided with covers which prevent the glucose material contained in the vessel from flowing into said air inlets when the apparatus is stopped.

The side walls of said vessel are preferably isolated and the vessel is preferably closed by a cover having an air discharge opening.

The discharge opening for the glucose mass is preferably provided in the vessel in the side wall thereof. A screen which prevents large particles from leaving the vessel covers said opening which may be connected to conduit means passing the glucose product discharged from the vessel to a conveyor, for example, a conveyor belt.

Another preferred embodiment of the apparatus of the invention comprises means for introducing and distributing the glucose solution within the glucose mass near the bottom of the vessel.

In such an apparatus the means for introducing and distributing the glucose solution within the glucose mass are preferably discharge openings which may be moved in relation to said granular glucose mass.

A disintegrator is preferably mounted at the surface level of the glucose mass in said vessel. The disintegrator is suitably an impact mill comprising one or more impellers mounted on a shaft of a high speed motor. The disintegrator is preferably adjusted so that the impellers are partly submerged in the glucose mass and are preferably located adjacent to the side wall of said vessel.

The impellers are preferably placed in a housing opening into the glucose below the surface thereof.

When the impellers rotate the agglomerates are hit by the impellers and are broken down.

The paddle mixer preferably comprises a central shaft passing through the bottom of the vessel and agitator arms which are attached to the top of said shaft. The agitator arms are preferably hollow and tubes for supplying glucose solution are preferably mounted in said hollow arms. The lowermost part of the agitator arms which during rotation move a short distance above the bottom of the vessel is provided with discharge openings for the glucose solution.

The glucose solution is supplied to said tubes from a supply of hot glucose solution which is connected with a tube in the hollow shaft of the agitator. In order to avoid crystallization in the glucose solution feed system the tubes including those in the agitator arms are preferably provided with steam jackets which are connected to return tubes for condensate. The shaft of the agitator is preferably provided with a rotating distributor through which the external feed system for glucose solution steam is connected to the internal feed system.

When starting up a preferred embodiment of the crystallizer described above the vessel is filled with a suitable amount of glucose mass. The glucose mass present in the crystallizer preferably corresponds to the amount of dry glucose product supplied to the crystallizer in the form of glucose solution in about 2 hours. After starting the agitator and if necessary the disintegrator and the introduction of hot air the glucose solution which is further heated during the passage through the tubes to a temperature of about 100° C. is introduced into the glucose mass through the agitator arms. These arms are preferably rotating at a speed of 25 r.p.m.

During the rotation of the agitator arms and the introduction of glucose solution into the glucose mass the glucose solution is intimately mixed with the glucose mass and the glucose particles acting as seeds initiate a very quick crystallization.

The free-flowing glucose product formed is discharged from the vessel at the surface level of the glucose mass at a rate corresponding to the rate of supply of glucose on dry basis to the crystallizer. The screen covering the opening at the surface level of the glucose mass which screen may have openings of a size of about 5 mm. prevents lumps having larger dimensions from leaving the vessels.

The air introduced into the bottom of the vessel does not fluidize the glucose mass but only reduces the moisture content in the glucose solution by evaporation. When using a glucose solution having a Brix-value of about 88, 10% of water has to be removed in order to obtain a dry storage stable product.

After leaving the vessel through the discharge opening in the cover of the vessel the air may be passed through a cyclone in which entrained glucose particles, if any, are separated.

When the glucose product has been discharged from the crystallizer it is preferably conditioned for about 15 minutes without contact with moist air before it is put into sacks at a temperature of about 35° C. By conditioning the product in this manner it is ensured that droplets, if any, of the glucose solution present on the surface of the solid gluclose particles do not cause said particles to adhere to one another. Thus, the conditioning increases the storage stability.

BRIEF DESCRIPTION OF THE DRAWINGS

FIG. 1 shows a vertical sectional view of a crystallizer of the invention and

FIG. 2 shows the crystallizer of FIG. 1 in a horizontal view but without the agitator means.

DESCRIPTION OF THE PREFERRED EMBODIMENTS

Referring to the drawings the numeral 1 designates generally a crystallizer comprising a cylindrical vertical vessel 2 which at the lower portion of the side wall is surrounded by an isolation 3. The bottom of the vessel 2 is provided with a number of air inlet openings 4, each covered by a cover 5. The air inlet openings are connected with two circular ducts 6 which are connected to a fan 7 by means of a branch pipe 8. The vessel 2 is closed at its upper end by a cover 9 having an air outlet 10. At one side of the vessel 2 there is mounted a high-speed motor 11 having a motor shaft on which an impeller 12 is mounted. At the opposite side of the vessel 2 there is provided an opening 13 which is covered by a screen. The opening 13 communicates with a vertical conduit 14. Below said conduit 14 there is provided an inclined plate 15 leading to a conveyor belt 16.

The crystallizer shown in the drawings also comprises an agitator means comprising a central hollow shaft 17, the top of which supports hollow agitator arms 18. Syrup tubes surrounded by steam jackets and condensate return tubes are provided in said hollow agitator arms 18. At the lower edge of the agitator arms there are provided syrup discharge openings which are not shown in the drawings.

At the lower end of the central shaft 17 there is provided driving means (not shown) for rotating said shaft. Furthermore, a rotating distributor box 20 is located at the lower end of the hollow shaft 17. The distributor box 20 is connected with a conduit 21 for supplying syrup and a conduit 22 for supplying steam to the crystallizer. Furthermore, the distributor box 20 is connected to a conduit 23 for discharging condensate from the crystallizer. The crystallizer shown in the drawings is mounted on a support 24.

The operation of the crystallizer is as follows:

Syrup is supplied to the crystallizer through the conduit 21 and flows through the distributor box 20, the hollow shaft 17 and the hollow agitator arms 18 to the syrup discharge openings at the lower edge of the agitator arms 18. During said flow the syrup is maintained at a high temperature by means of steam supplied to the crystallizer 1 through the conduit 22 and also flowing through the distributor box 20, the hollow shaft 17 and the hollow agitator arms 18. The condensate formed in the steam tubes is discharged through the distributor box 20 and the conduit 23. When the agitator arms are rotating through the glucose mass 25 contained in the vessel 2 the syrup is intimately mixed with said glucose mass which initiates a rapid crystallization of the syrup. At the same time air is blown into the bottom of the container 2 through the air inlets 4. The air supplied to the crystallizer causes the water contained in the syrup to be evaporated and removed from the crystallizer through the air outlet 10. The air outlet 10 is preferably connected to a cyclone (not shown) in which entrained glucose particles are separated.

Agglomerates will have a great tendency to concentrate at the surface layer in which they are subjected to impacts from the rotating impeller 12 and are consequently broken down. The fines have a tendency to move towards the bottom and combine with syrup droplets.

Glucose particles having such a size that they can pass through the screen in the opening 13 will be removed from the container 2 when the agitator arms are rotating. Such particles fall down through the conduit 14 onto the plate 15 and pass from said plate onto the conveyor belt 16. When being transported away from the crystallizer the glucose product is preferably conditioned in contact only with dry air before it is put into sacks for storage.

The invention will now be further illustrated with reference to the following example.

EXAMPLE 25 kg. milled glucose sugar having the following particle sizes: 45% having a particle size of less than 500 $\mu$m., 34% having a particle size of between 500 and 1000 $\mu$m., 17% having a particle size of between 1000 and 2000 $\mu$m. and 1% having a particle size of above 2000 $\mu$m. was filled into a crystallizer of the type shown in the drawings. The agitator was rotating at a speed of about 25 r.p.m. and the disintegrator at a speed of about 4000 r.p.m. Before supplying syrup to the crystallizer the glucose sugar was heated to a temperature of about 80° C. by blowing hot air into said mass through the air inlets. Then syrup was pumped into the crystallizer at a rate of 10 litres per hour (12 kg. of dry substance per hour). The syrup used had been prepared by an enzymatic hydrolysis of potato starch and subsequently treated with carbon and with an ion exchanger. The syrup had been concentrated to obtain a Brix value of 88–90° and a temperature of about 100° C. The temperature within the steam jackets surrounding the syrup tubes was 110–115° C. The opening in the side wall of the vessel was covered by a screen having 5 mm. openings. The removal of glucose product from the vessel was adjusted so that the contents of solid glucose sugar was constantly 25 kg. These conditions were maintained during the whole process which lasted for 10 hours during which about 12 kg. of the final product was discharged per hour.

The temperature of the air was maintained constant and the temperature within the crystallizer varied between 80 and 85° C. The product discharged from the apparatus after 1 hour had the following particle sizes: 2% having a particle size less than 500 $\mu$m., 60% having a particle size of between 500 and 1000 $\mu$m., 32% having a particle size of between 1000 and 2000 $\mu$m., and 5% having a particle size of above 2000 $\mu$m. After 7 hours of operation the particle sizes were as follows: 2% having a particle size of less than 500 $\mu$m., 40% having a particle size of 500–1000 $\mu$m., 52% having a particle size of between 1000 and 2000 $\mu$m., and 6% having a particle size of above 2000 $\mu$m. After 10 hours of operation the particle sizes were as follows: 2% <500 $\mu$m., 38% 500–1000 $\mu$m., 59% 1000–2000 $\mu$m. and 1% >2000 $\mu$m. Equilibrium conditions were obtained or almost obtained after ½–1 hour and after this time very small variations of the product as far as particle size and shape are concerned were observed. Analysis of the product showed that the dry matter content was 99.3% and very small deviations therefrom were found during the operation. The DE-value of the final product was 98 and the ratio of alpha to beta dextrose which initially was 30:60 was changed during the process and equilibrium conditions were established at a ratio of 25:75.

Storage stability tests were performed on fresh product which was filled into a polyvinylchloride cylinder. The height of said cylinder was about 20 cm. and it had a base area of 100 cm.$^2$. The temperature of the product was 45° C. after it had been introduced into said cylinder and the filling of the container took not more than 10 minutes from the moment the product had left the crystallizer.

An iron piston having a weight of 60 kg. was placed on top of the product without touching the cylinder. After some days the cylinder was removed and no tendency of caking in the product was observed. If the final product is investigated under microscope spherical particles having a crystalline structure can be observed.

Although the above disclosure relates to the production of a free-flowing glucose product it is to be understood that other free-flowing crystallizable carbohydrates can also be prepared by the process according to the invention.

What is claimed is:

1. A continuous process for producing a free-flowing granular glucose product from a glucose solution having a DE-value of at least 88 and a dry matter content of at least 80%, which solution has been prepared by starch hydrolysis, characterized in continuously supplying said glucose solution to a vessel containing a solid granular glucose mass of a temperature of 50–100° C., said glucose solution being supplied at an hourly rate of less than twice the amount of the glucose mass present, mechanically stirring said mixture of glucose solution and glucose mass, subjecting the glucose particles at the surface level of the glucose mass to mechanical disintegration in addition to said stirring and continuously removing the free-flowing granular glucose product formed.

2. A process as in claim 1, characterized in removing the glucose product at a rate corresponding to the rate of supply of glucose present in said glucose solution.

3. A process as in claim 1, characterized in introducing the glucose solution in the lower portions of the glucose mass in said vessel.

4. A process as in claim 1, characterized in removing the glucose product formed from the upper portions of the glucose mass in said vessel.

5. A process as in claim 1, characterized in removing glucose granules of a size below a predetermined value.

6. A process as in claim 1, characterized in passing streams of air of controlled temperature through the agitated glucose mass.

7. A process as in claim 1, characterized in that the temperature of the glucose mass is 70–80° C.

8. A process according to claim 1, characterized in using a cation- and anion-exchanged glucose solution.

9. A process according to claim 1, characterized in that the glucose solution has a Brix value of 87–91.

10. An apparatus for producing a free-flowing granular glucose product from a glucose solution having a DE-value of at least 88 and a dry matter content of at least 80%, which solution has been prepared by starch analysis, including a vessel containing a solid granular glucose mass of a temperature of 50–100° C. into which the glucose solution is continuously supplied, said vessel being a vertical cylindrical vessel having an essentially plane bottom provided with air inlets, said air inlets being connected with sources for supplying air of controlled temperature, a paddle mixer provided within said vessel, means for supplying the glucose solution to said vessel and means for discharging free-flowing granular glucose products from said vessel.

11. An apparatus according to claim 10, characterized in that said air inlets are provided with covers.

12. An apparatus according to claim 10, characterized in that the vessel is provided with a cover and air outlet tube.

13. An apparatus according to claim 10, characterized in that the means for discharging the product comprise an opening in the vessel near the surface of the glucose mass and a screen covering said opening.

14. An apparatus according to claim 10, characterized in that the means for supplying glucose solution to the container are provided with means for heating said solution.

15. An apparatus according to claim 10, characterized in that it further comprises a disintegrator mounted at the surface level of the glucose mass.

16. An apparatus according to claim 15, characterized in that the disintegrator consists of impellers mounted in a housing opening into the glucose mass below the surface thereof.

17. An apparatus according to claim 10, characterized in that it comprises means connected to said paddle mixer for introducing and distributing the glucose solution within the glucose mass near the bottom of the vessel.

18. An apparatus according to claim 17, characterized in that the means for introducing and distributing the glucose solution near the bottom of the vessel are movable in relation to said glucose mass.

References Cited

UNITED STATES PATENTS

| 797,965 | 8/1905 | Lagrange | 127—15 |
| 910,037 | 1/1909 | Altolaguirre et al. | 127—21 X |
| 3,239,378 | 3/1966 | Opila | 127—60 |
| 3,271,194 | 9/1966 | Oikawa | 127—15 X |
| 3,391,003 | 7/1968 | Armstrong | 99—141 X |

FOREIGN PATENTS 461,056   11/1949   Canada.

JOSEPH SCOVRONEK, Primary Examiner

S. MARANTZ, Assistant Examiner

U.S. Cl. X.R.

127—17, 21, 22, 58, 63; 241—46.11, 46.17; 259—7